Jan. 12, 1937. W. E. BARBER ET AL 2,067,815
POWER OR MOVEMENT TRANSMITTING MECHANISM
Filed April 10, 1936
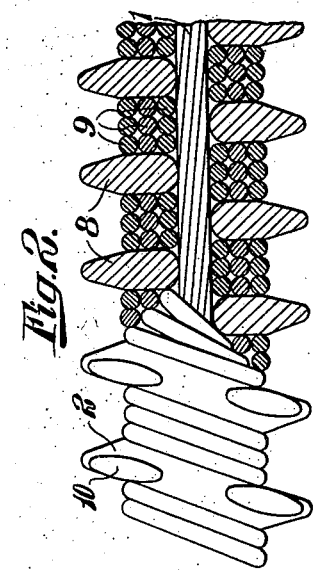
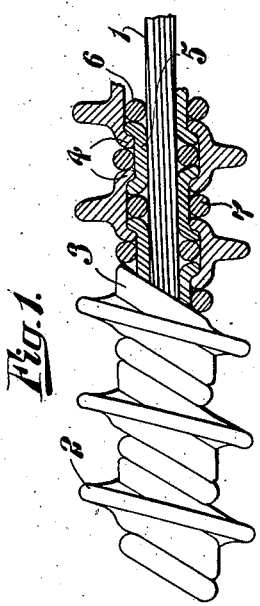
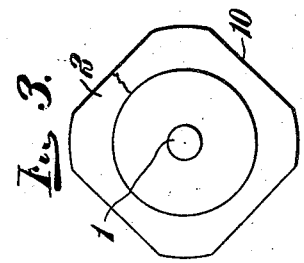
INVENTOR
William Edward Barber
and Henry Archibald Watts
BY
ATTORNEY Patented Jan. 12, 1937

2,067,815

UNITED STATES PATENT OFFICE 2,067,815

POWER OR MOVEMENT TRANSMITTING MECHANISM

William Edward Barber and Henry Archibald Watts, South Farnborough, England

Application April 10, 1936, Serial No. 73,788
In Great Britain May 15, 1935

8 Claims. (Cl. 74—501)

This invention relates to power or movement transmitting mechanism of the kind wherein a cable flexible in all directions is provided and which is of such a nature that it is adapted to transmit movements in both directions, that is to say both movements due to compression forces as well as those due to tension forces, and it includes improvements in the construction and arrangement of such mechanism.

One feature of the invention relates to a flexible element for the transmission of power or movement including a helical rib on the surface, the turns of which are spaced apart and held in spaced relation by intermediate elements between the turns of the rib, or bridging the gap between adjacent turns.

To this end the flexible element may be formed of several layers, of which the outermost layer embodies the projecting rib formed in two sections, respectively an inner and an outer section, the outer section comprising a metal strip provided towards the centre of its width with an outwardly extending rib, the opposite surface of the strip being provided with inturned edges. The said inturned edges are adapted to engage between the upturned edges of another strip forming the aforesaid inner section, whereby an effective anchorage of the outermost section is obtained.

In this construction, for the purpose of increasing the flexibility of the cable, a round or other wire can form part of both the inner and outer sections, being interposed between the turns of the metal strips forming said sections.

In another form of the invention, the projecting rib may be formed by the edge of a strip, the side faces of said strip being spaced apart by a number of layers of wires.

Moreover, the helically extending rib which is normally of circular form in end view may be flattened at a number of points around its periphery so that in end view the rib is of square or other polygonal form, if desired with somewhat rounded corners.

By virtue of this arrangement, the flexible element or cable, which is normaly located in an outer guide casing, which may be bent to follow a desired path, can be readily lubricated while friction within the guide casing is reduced since the bearing area of the cable on the inner surface of the guide casing is reduced. Moreover, the cable is of great utility since the helically disposed rib can be used to engage with a toothed surface such as a gear wheel or a member in the nature of a nut can be adapted to engage with said cable, whereby on rotation of the said cable the nut is displaced longitudinally of the cable. Alternatively, if the nut is held stationary, rotation of the cable will cause a longitudinal traverse of the latter through the nut. Moreover, rotation of the said nut will serve to apply more or less gradual longitudinal movement to the cable.

The accompanying drawings serve to illustrate various forms which the invention may take, together with certain examples of the application of the said cables.

Fig. 1 illustrates partly in elevation and partly in section, one form of flexible cable in accordance with the invention.

Fig. 2 illustrates, similarly, another embodiment of the invention.

Fig. 3 is an end view of the cable of either of Figs. 1 or 2, showing the shaping of the rib.

The cable in accordance with the invention can take various forms, Figs. 1 and 2 illustrating two embodiments. In each case a core 1 comprised by a bundle of wires laid with comparatively great pitch is provided and on to this one or more layers is/are wound. A helically projecting rib 2 is formed on the outer surface of the cable, the turns of said rib being positively spaced apart.

In the embodiment of Fig. 1, the rib 2 is formed upon a strip of metal 3, the edges of which are flanged downwardly at 4. Below said strip 3 and arranged to bridge the gap between adjacent turns thereof is a channelled strip 5 wound on to the core 1, the downturned parts 4 of the strip 3 being adapted to engage within the channel. If desired, another layer of wires may be wound on to the core 1 before the channelled strip 5 is put into position.

A wire of round or other section 6 may be wound on to the core 1 between the turns of the channelled strip 5 and a wire 7 between the turns of the strip 3. The said wires 6 and 7 serve to improve the flexibility of the finished cable and at the same time serve positively to space the turns of the strips 3 and 5.

The inner core 1 is particularly adapted to transmit tension forces from one point to another of the cable while the outer layer, comprised by the strips 3 and 5 and the intermediate wires 6 and 7, serves effectively to transmit compression forces. The said forces can be transmitted to and from the cable by means of gear wheels or by means of other members engaging the rib portions of the cable, whereby direct push and pull movements can be applied thereto.

In the embodiment shown in Fig. 2, the rib 2 is formed by the edge of a strip 8 wound edgewise on to the core 1, the turns of the strip 8 being spaced apart by a number of layers of wires 9 disposed between the turns thereof.

Part of the surface of the rib 2 may be flattened as indicated at 10, Figs. 2 and 3, for the purpose of reducing friction in the guide casing and for permitting drive to and from the cable by means of flat-faced gear wheels. Preferably, and as shown, a number of said flattened portions 10 may be provided, for example four as shown.

The invention is not limited to the precise forms or details of construction described, as these may be varied to suit particular cases.

What we claim and desire to secure by Letters Patent of the United States of America is:—

1. A flexible cable for transmitting power or movement, comprising a core adapted to transmit tension forces, a pressure-transmitting element including a plurality of helically wound layers, and a helically wound strip member forming part of said pressure-transmitting element and constituting a helical rib on the surface of the cable.

2. A flexible cable for transmitting power or movement as claimed in claim 1 wherein the turns of the helically wound strip member are positively spaced apart by at least one of the helically wound layers of the pressure-transmitting element.

3. A flexible cable for transmitting power or movement as claimed in claim 1 wherein the helically wound strip member carries a rib and in which a bridging strip is arranged between adjacent turns of said strip member.

4. A flexible cable for transmitting power or movement as claimed in claim 1, comprising a twisted wire core, a metal strip member with upturned edges wound helically on said core, a further strip member with downturned edges wound on said first-mentioned strip member and bridging the gap between the turns thereof with the downturned edge portions of the further strip in engagement with the upturned edge portion of said first-mentioned strip, and a peripherally projecting portion on said further strip, said projection forming a helically extending rib on the cable.

5. A flexible cable for transmitting power or movement as claimed in claim 1, comprising a twisted wire core, a metal strip member with upturned edges wound helically on said core, a wire interposed between the turns of said strip member, a further strip member with downturned edges wound on said first-mentioned strip member and with its downturned edges in engagement with the upturned edges of the first-mentioned strip member, a wire interposed between the turns of said further strip member, and a continuous radial projection on said further strip member adapted to constitute a helically extending rib on the cable.

6. A flexible cable for transmitting power or movement as claimed in claim 1 in which the tension-transmitting core is flexible and wherein the helically wound strip member forming part of the pressure-transmitting element is wound edgewise onto said core.

7. A flexible cable for transmitting power or movement as claimed in claim 1 in which the tension-transmitting core is flexible and having a metal strip member wound edgewise helically on said core, together with a plurality of layers of wires interposed between the turns of said edgewise-wound strip and adapted to space the turns thereof, said edgewise-wound strip projecting beyond the surface of said wires and forming a helically extending rib on the surface of the cable.

8. A flexible cable for transmitting power or movement as claimed in claim 1 wherein the helically-wound strip member has flattened portions on the edge thereof which give to the cable, when seen in end section, a polygonal form.

WILLIAM EDWARD BARBER.
HENRY ARCHIBALD WATTS.